(12) United States Patent
Huang

(10) Patent No.: US 7,669,293 B2
(45) Date of Patent: Mar. 2, 2010

(54) METAL CABLE TIE HAVING A DENT IN GEOMETRIC SHAPE

(75) Inventor: Min-Xiong Huang, Chang Hwa (TW)

(73) Assignee: K.S. Terminals, Inc., Chang Hwa (TW)

( * ) Notice: Subject to any disclaimer, the term of this patent is extended or adjusted under 35 U.S.C. 154(b) by 548 days.

(21) Appl. No.: 11/509,042

(22) Filed: Aug. 24, 2006

(65) Prior Publication Data
US 2008/0005872 A1    Jan. 10, 2008

(30) Foreign Application Priority Data
Jun. 7, 2006    (TW) ............................... 95120265 A

(51) Int. Cl.
*F16L 33/00*    (2006.01)
*B65D 63/08*    (2006.01)

(52) U.S. Cl. .................... 24/25; 24/20 EE; 24/20 R

(58) Field of Classification Search ............... None
See application file for complete search history.

(56) References Cited

U.S. PATENT DOCUMENTS

| | | | |
|---|---|---|---|
| 4,399,592 A * | 8/1983 | Chopp et al. | 24/25 |
| 5,103,534 A * | 4/1992 | Caveney | 24/16 PB |
| 6,076,235 A * | 6/2000 | Khokhar | 24/25 |
| 6,647,596 B1 * | 11/2003 | Caveney | 24/21 |
| 7,302,732 B2 * | 12/2007 | Alley | 15/250.4 |

* cited by examiner

*Primary Examiner*—Jack W. Lavinder
(74) *Attorney, Agent, or Firm*—Ming Chow; Sinorica, LLC

(57) ABSTRACT

A metal cable tie formed with an elongate metallic strap and a metallic locking head. The elongate metallic strap has a first end and a second end opposite the first end. The metallic locking head is secured to the first end of the metallic strap and comprises a strap entry face, a strap exit face, and a floor and a roof near the strap exit face for receiving the second end of the strap in order to form a closed ring structure. Moreover, a longitudinal slit and a metallic roller means are deployed between the strap entry face and the strap exit face of the metallic locking head in order to lockingly engage the metallic strap. A retention means extends from the roof of the metallic locking head to the strap exit face in order to captively hold the metallic roller means. When the strap is lockingly engaged, the metallic roller means captively held in the metallic locking head can move between the retention means near the strap exit face and a fixed position near the strap entry face, wherein the fixed position is the locking position of the roller means formed by a dent in geometric shape located on the first end of the metallic strap.

13 Claims, 11 Drawing Sheets

(5A)

(5B)

(5C)

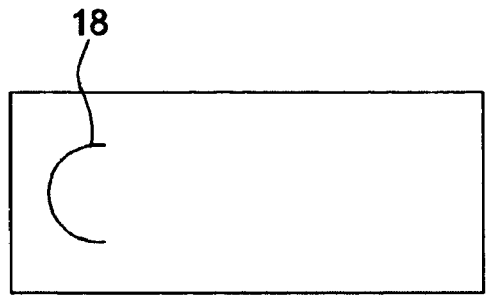
(4A)
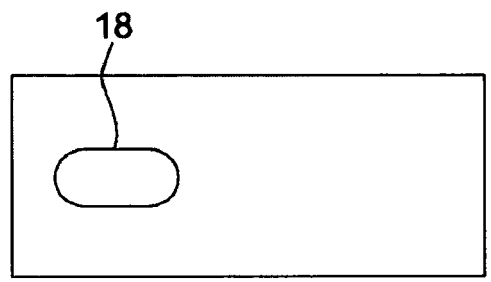
(4B)
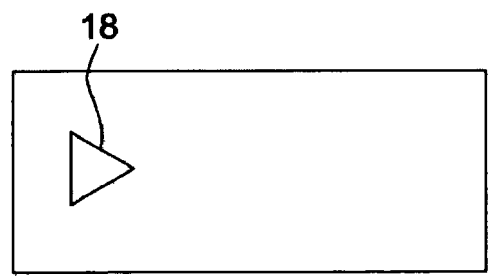
(4C)
FIG. 4

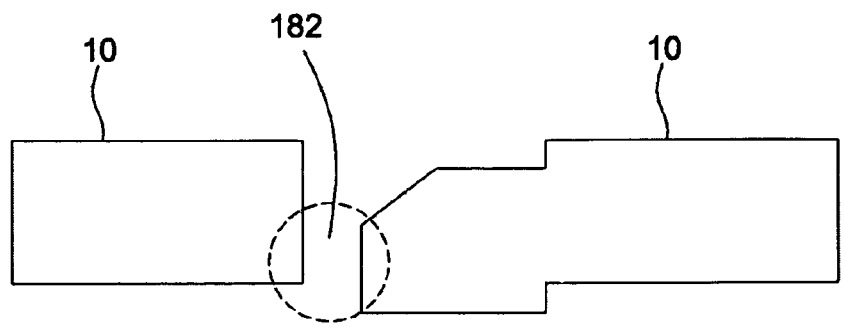
(5A)
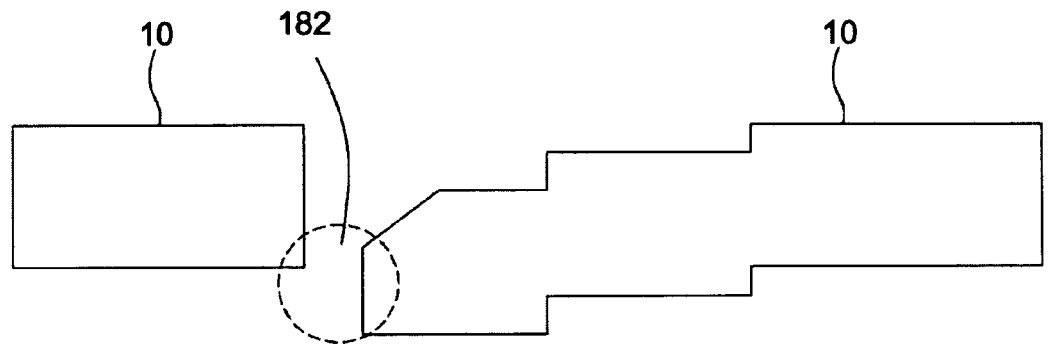
(5B)
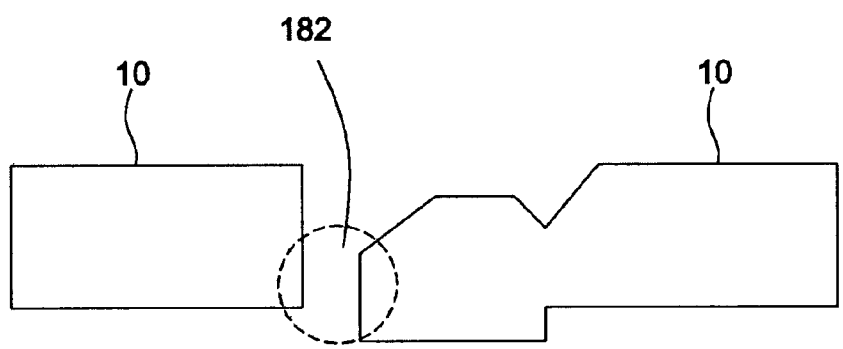
(5C)
FIG. 5

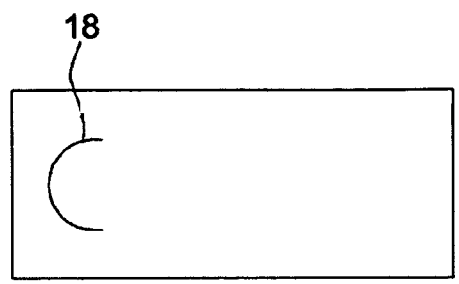
(6A)
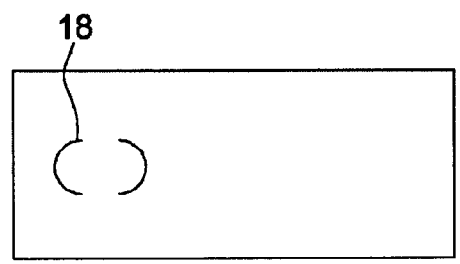
(6B)
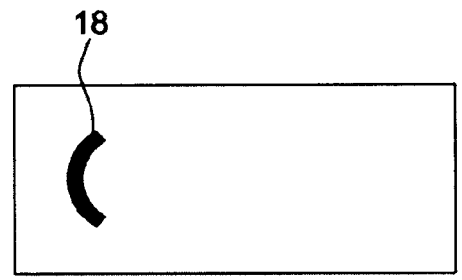
(6C)
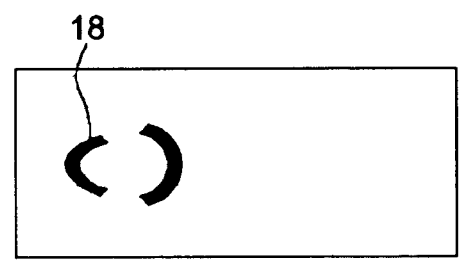
(6D)
FIG. 6

1
METAL CABLE TIE HAVING A DENT IN GEOMETRIC SHAPE

BACKGROUND OF THE INVENTION

1. Field of the Invention

The present invention is related to a metal cable tie, and more specifically, to a metal cable tie using roller means as its locking device.

2. The Prior Arts

Generally speaking, large carriers such as cargo ships usually need a large number of cables in order to monitor the condition of the carriers; therefore, a large number of cable ties are also needed to tie and fix these cables. Due to the difference in the thickness and number of each bunch of cables, adjustable cable ties that can properly fix the cables are thus needed.

The cable ties used in the prior art cannot fully fix the cables. The key problem is whether the locking head can lock tightly. Another problem is that gravity can hold the locking ball out of locking engagement and cause the strap to release. U.S. Pat. No. 6,647,596 provides a method of adding a strap aperture in order to fix the ball and prevent the strap from pulling out of the locking head. Yet a basic problem exists in this design, which is that the ball does not necessarily go into the aperture, and therefore the locking ball drops because of changing shape or vibration of cables and thus cannot achieve the function of long-term fixation.

Concerning the defects of the prior art, the present invention provides an improved cable tie structure in which the locking ball can roll into a fixed position of a dent in geometric shape more readily and cannot move easily so that the purpose of the cable tie to securely engage the cables can be achieved.

SUMMARY OF THE INVENTION

The present invention first provides a metallic strap, which comprises a first end and a second end opposite the first end, a bent portion being formed on the tail end of the first end of the strap in order to lockingly engage a metallic locking head. Wherein a fixed position formed by a dent in geometric shape is disposed on the strap, and the geometric shape is selected from the group consisting of a cross, an X, two intersecting crosses, three intersecting crosses, or a ring-like shape, etc.

The present invention then provides a metallic locking head disposed on a metal cable tie, which comprises a strap entry end and a strap exit end and also a ceiling and a floor near the strap exit end of the metallic locking head. A longitudinal slit is further disposed on the metallic locking head between the strap entry end and the strap exit end, a retention means is disposed near the exit end and extends from the ceiling toward the direction of the exit end, and a metallic roller means contacts and lockingly engages said fixed position.

The present invention further provides a metal cable tie which is formed with a metallic strap and a metallic locking head; the metallic strap has a first end and a second end opposite the first end, and the metallic locking head is secured to the first end of the metallic strap and has a strap entry face, a strap exit face, a ceiling and a floor near the exit face for receiving the second end of the strap in order to form a closed ring structure. A longitudinal slit and a metallic roller means are further disposed between the strap entry face and the strap exit face of the metallic locking head to lockingly engage the strap, and a retention means is disposed near the strap exit face in the metallic locking head. The retention means extends from the ceiling of the metallic locking head to the strap exit face in order to captively hold the metallic roller means. When the strap is lockingly engaged, the metallic roller means captively held in the metallic locking head can move between the retention means near the strap exit face and a fixed position near the strap entry face, wherein the fixed position being the locking position of said metallic roller means formed by a dent in geometric shape located on the first end of the metallic strap.

With the design provided by the present invention, the locking ball of the metallic roller means can roll into the fixed position of a dent in geometric shape ball more readily and cannot move easily so that the purpose of the cable tie to securely engage the cables can be achieved.

BRIEF DESCRIPTION OF THE DRAWINGS

FIGS. 4A~C are diagrams illustrating the forms of ring-like structure on the fixed position corresponding to FIG. 3 of the present invention.

FIG. 5 is a diagram illustrating the forms of dents on the fixed position corresponding to FIG. 3 of the present invention.

FIGS. 6A~D are diagrams illustrating the forms of semi-ring-like structure on the fixed position corresponding to FIG. 3 of the present invention.

DETAILED DESCRIPTION OF THE PREFERRED EMBODIMENT

The present invention discloses a structure of metal cable tie. Since some methods of fabrication and combination used within the structure have been disclosed in detail in the prior art, therefore the fabricating process of metal cable tie and the way of tying cable ties are not described in detail in the following description. Moreover, the diagrams included in the following are not completely drawn according to the real size and are only used to demonstrate features related to the present invention.

Figure 1:
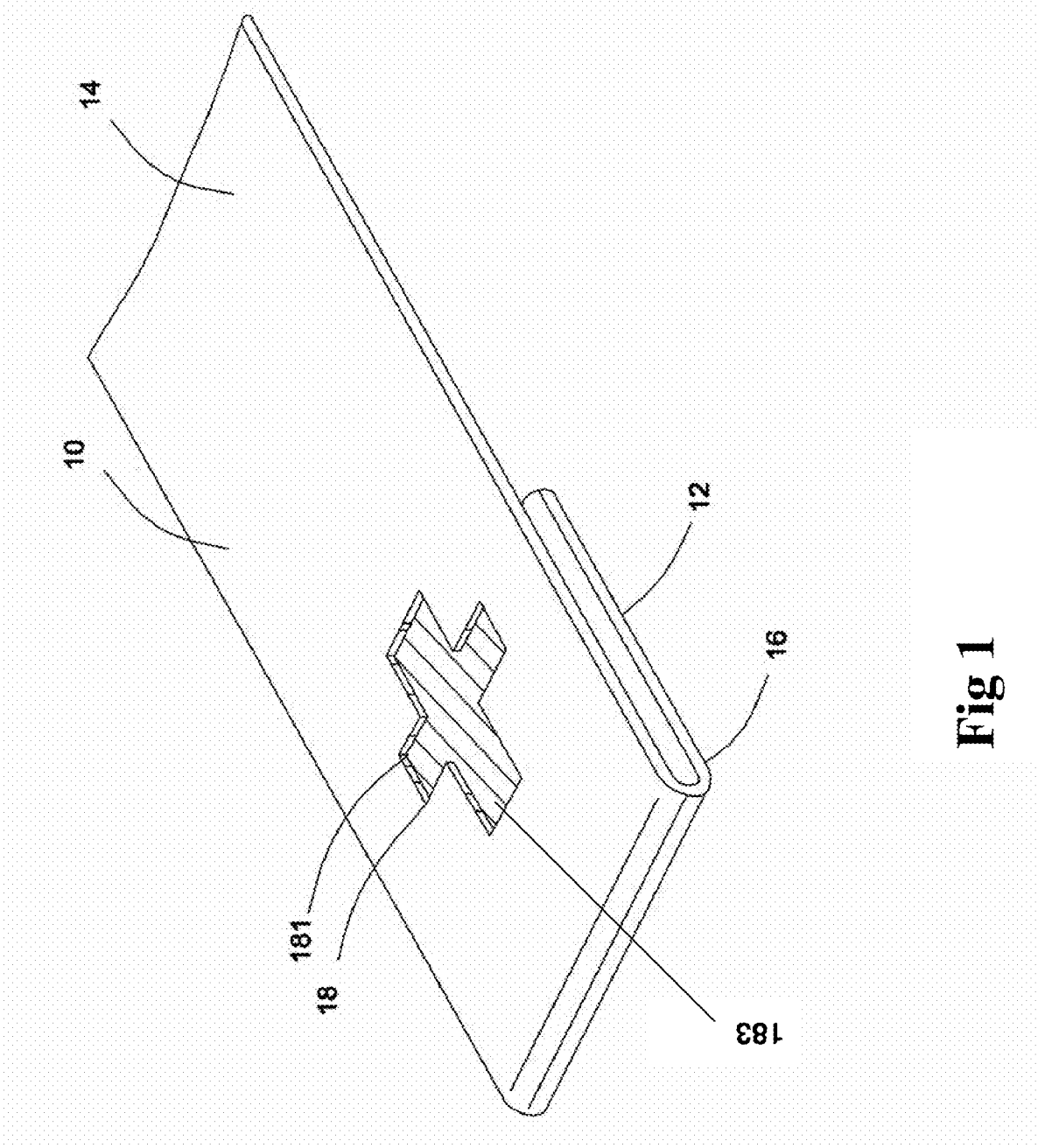
FIG. 1 is a diagram illustrating a metallic strap of the present invention.
Figure 2:
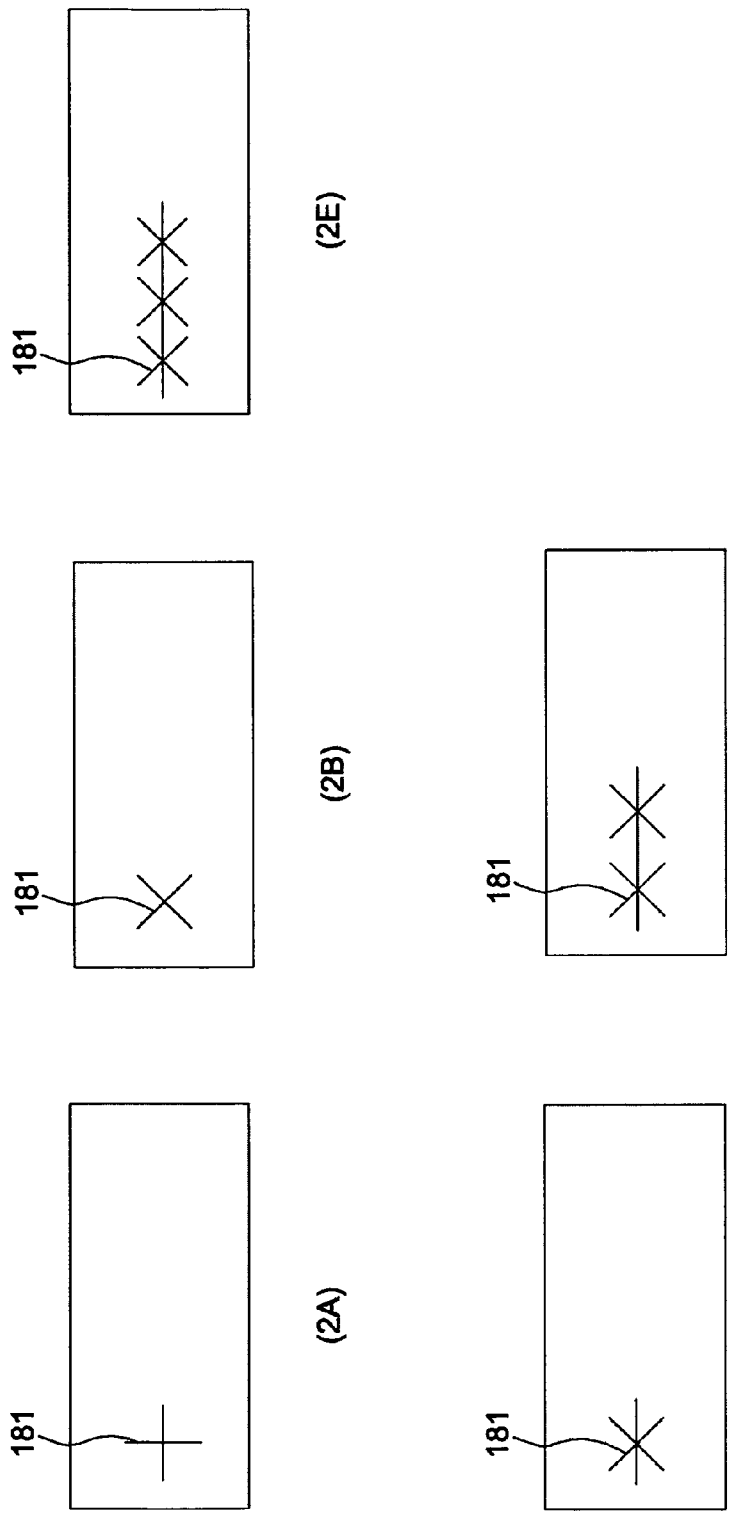
FIGS. 2A~D are diagrams illustrating the forms of dents on the fixed position corresponding to FIG. 1 of the present invention.

First of all, FIG. 1 is the diagram of a metallic strap provided by the present invention. The metallic strap structure 10 of the present invention is constituted by a first end 12 with a bent portion 16 formed on it and a second end 14 opposite the first end, wherein the bent portion 16 on the first end 12 is used to lockingly engage or firmly fasten a metallic locking head 20; the second end 14 is to be received by the metallic locking head 20 in order to form a closed ring strap to tie things. A fixed position 18 formed by a dent in geometric shape is disposed on the face of the first end 12 of the metallic strap, said dent in geometric shape is formed by stamping process or other extrusion processes. The width of the dent in geometric shape is better to be smaller than the width of the metallic strap, and the depth of the dent is better to be less than the thickness of metallic strap 10. Moreover, in order to effectively form the fixed position 18, at least part of the dent in geometric shape penetrates the metallic strap 10 and forms a slot. In addition, in order to form a small slope structure similar to a guideway, thus at least a dent in geometric shape 181 or the diameter of the dent or the long axis or the short axis of the dent is parallel to the longitudinal axis of the metallic strap. And the surface of the dent in geometric shape can have the shape selected from the group consisting of a cross, an X, two intersecting crosses, and three intersecting crosses, as shown in FIGS. 2A~E.

Figure 3:
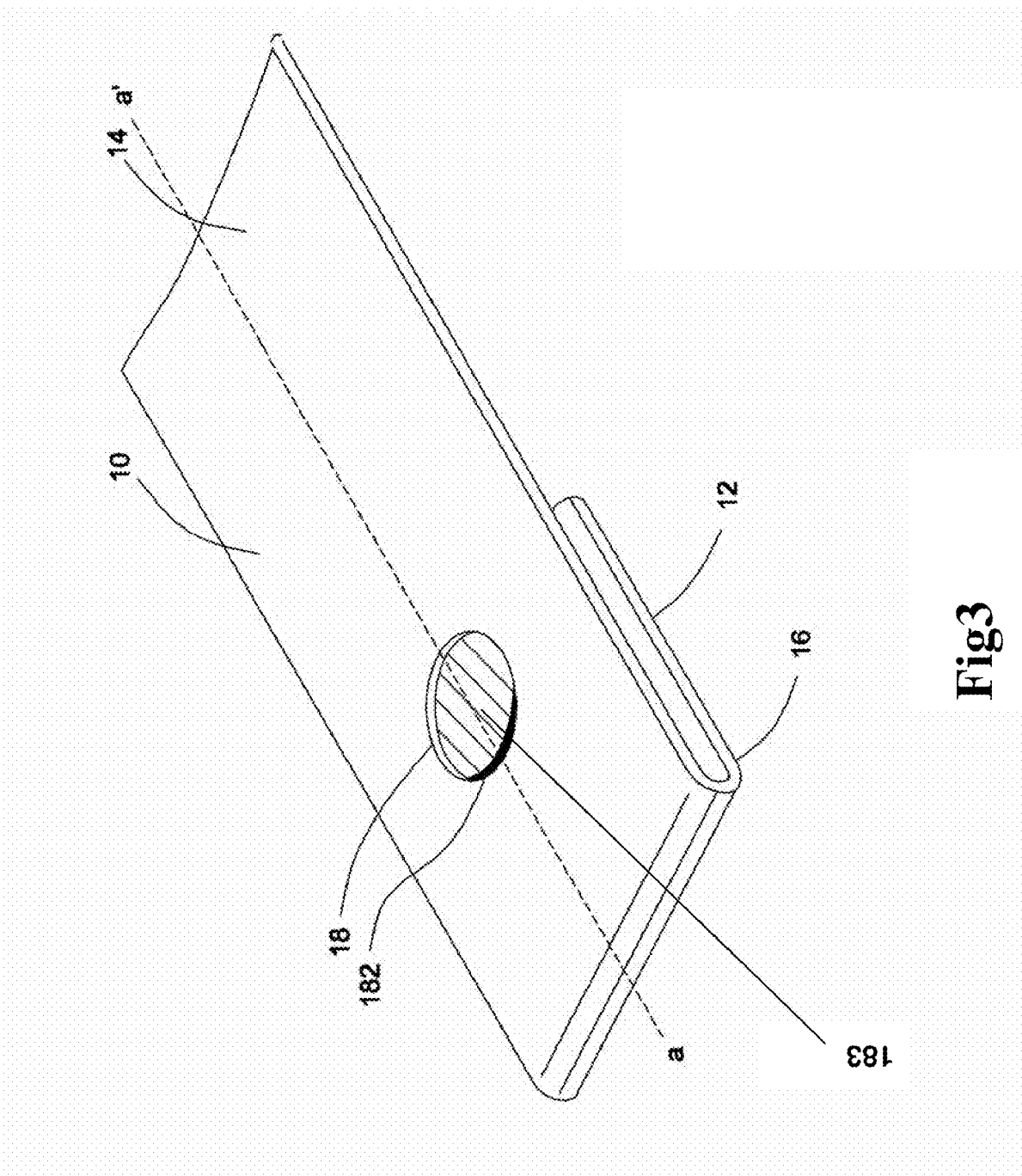
FIG. 3 is a diagram of another embodiment of the metallic strap of the present invention.

In the following, another preferred embodiment of the metallic strap of the present invention is disclosed, wherein the dent in geometric shape on the face of first end of metallic strap 10 is formed in a ring-like shape, as shown in FIG. 3, and said dent in the form of ring-like shape can be circular, elliptical, triangular, or in other ring-like shapes, as shown in FIGS. 4A~C. The dent in the form of ring-like shape in the present embodiment is composed of two semi-circles with different depths or two parts with different depths, wherein the depth of the semi-circle closer to the boundary area of the first end of the metallic strap is larger than that of the other semi-circle. And in a preferred embodiment, the deeper semi-circle penetrates the metallic strap 10 and a slot 182 is formed between the deeper semi-circle and the metallic strap 10, the side view of which is like a slope or a fault, as shown in FIG. 5A (the broken line in the diagram being the center of said dent in ring-like shape). In addition, said dent in ring-like shape 18 can be formed by a plurality of staircase structures with different depths, wherein the deepest part of staircase structures with different depths penetrates the metallic strap 10 and a slot is formed between the deepest part of staircase structures and the metallic strap 10, as shown in FIG. 5B. The structure of dent in ring-like shape 18 described above can be easily formed through the design of stamp and thus more complex structure of dent in ring-like shape can be used; therefore, within the dent in ring-like shape 18 in the metallic strap in the present invention, the circumference of semi-circle 183 which is farther from the boundary area of bent portion 16 of the first end of the strap can also be made deeper than the depth of the semi-circle connected to the strap, as shown in FIG. 5C. At the same time, in order to provide the metallic strap 10 with a good appearance and prevent from oxidation and corrosion, the metallic strap 10 is generally coated with a thin layer of material and this material can be paint or other oily compounds. In addition, the geometric shape on the metallic strap 10 of the present invention can be a dent formed by a structure in semi-ring-like shape, as shown in FIG. 6A; it also can be a plurality of structures in semi-ring-like shape, more particularly, a structure of a pair of opposite structures in semi-ring-like shape, as shown in FIG. 6B; moreover, the above-mentioned pair of opposite structures in semi-ring-like shape can be designed to be two structures in semi-ring-like shape in which one is larger than the other. Meanwhile, each semi-ring structure in the present embodiment can also be a penetrated arc-shaped groove, as shown in FIGS. 6C and 6D.

Figure 7:
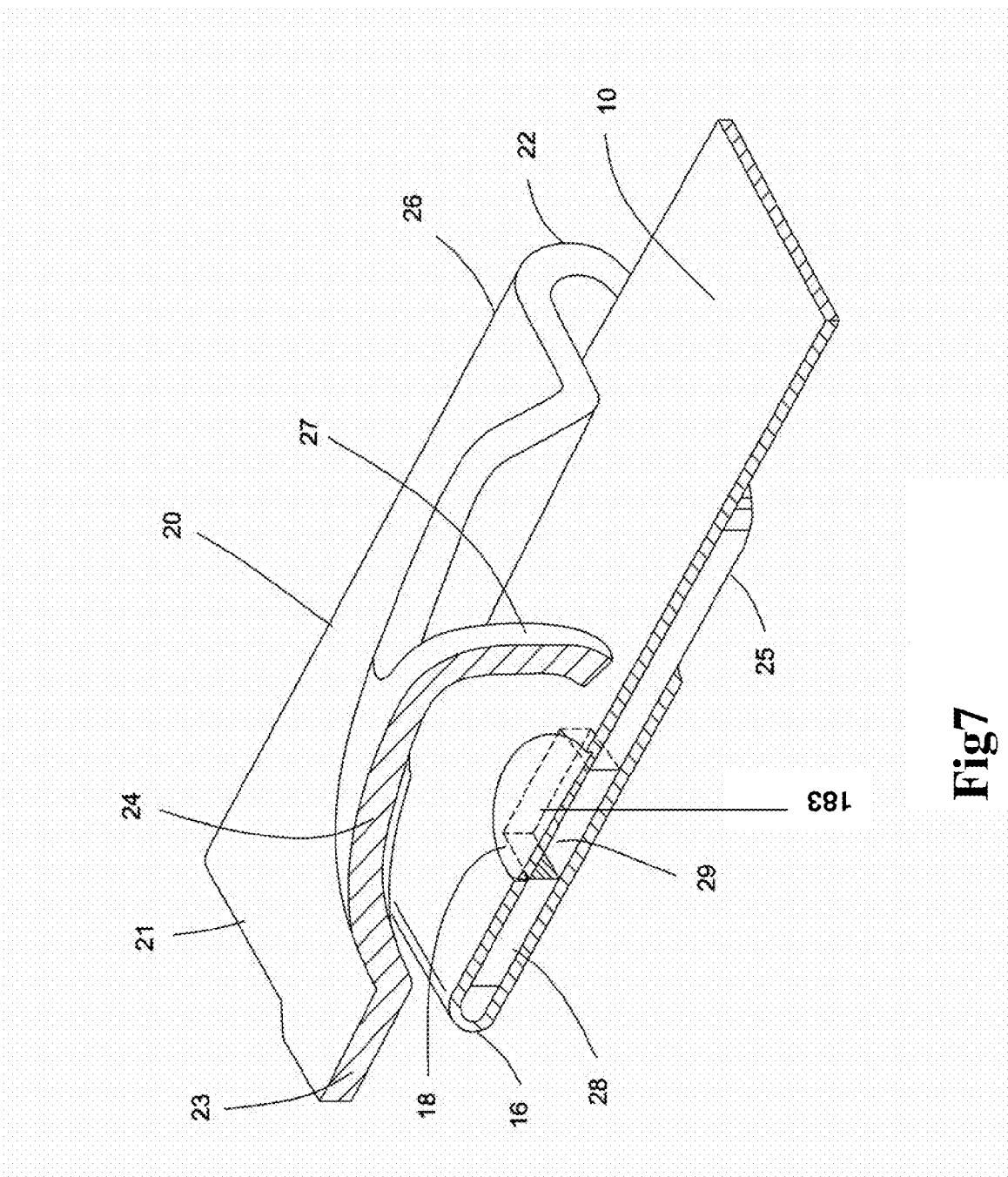
FIG. 7 is a diagram of the metallic locking head of the present invention.
Figure 8:
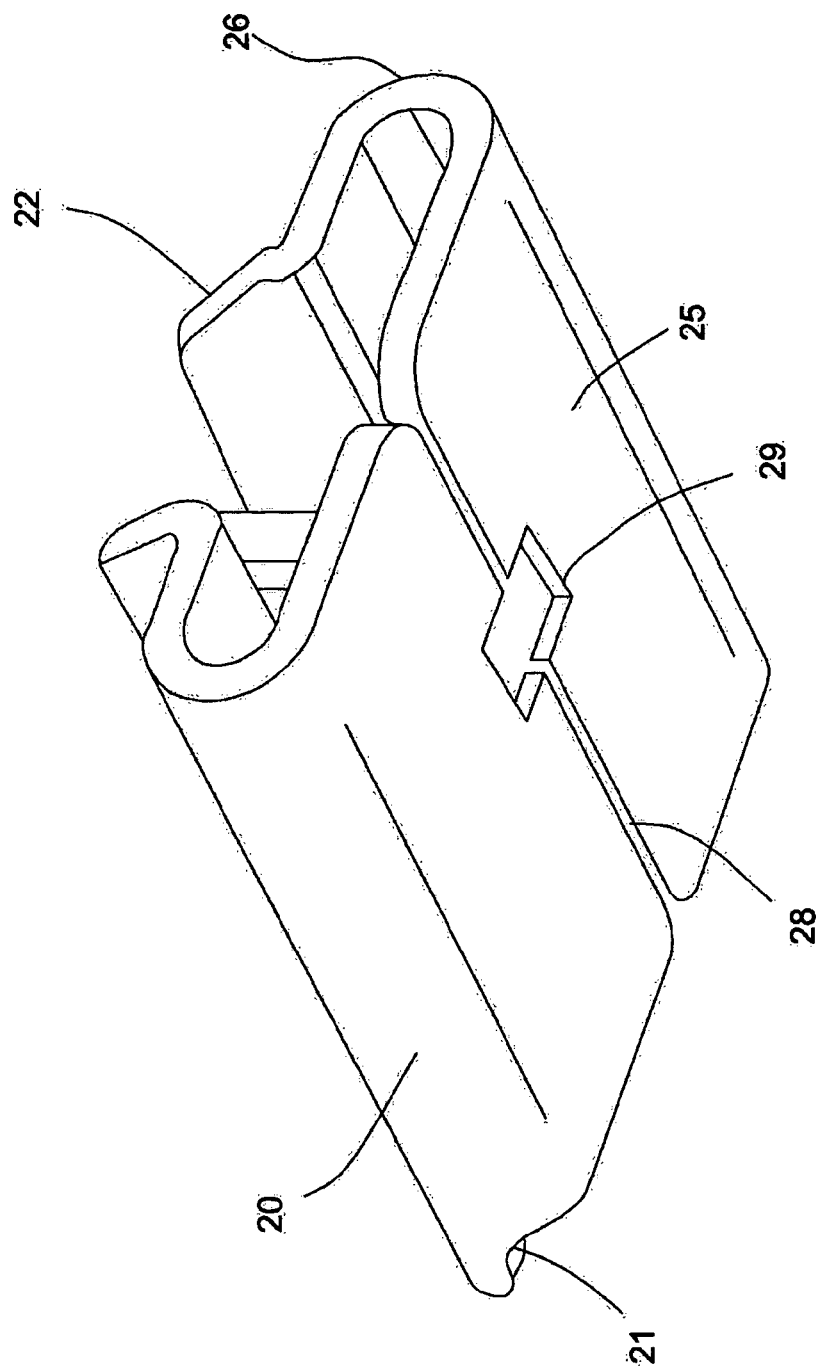
FIG. 8 is a bottom view illustrating the bottom layer of the metallic locking head of the present invention.

In the following, FIG. 7 is a diagram of a metallic locking head structure of the present invention. The metallic locking head 20 of the present invention comprises a strap entry end 21 and a strap exit end 22, said strap entry end and strap exit end being defined by a ceiling 23, a roof 24, and a bottom wall 25 connected to said roof and a pair of sidewalls 26. The bottom wall 25 of the metallic locking head 20 has a longitudinal slit 28 and an aperture in geometric shape 29 disposed near the strap entry face 21 of metallic locking head 20 and connected to said longitudinal slit. The aperture in geometric shape 29 in the present invention is formed in the shape of a rectangle. Generally speaking, the long axis of rectangular aperture 29 is disposed to be perpendicular to the longitudinal slit 28, please refer to FIG. 8.

Figure 9:
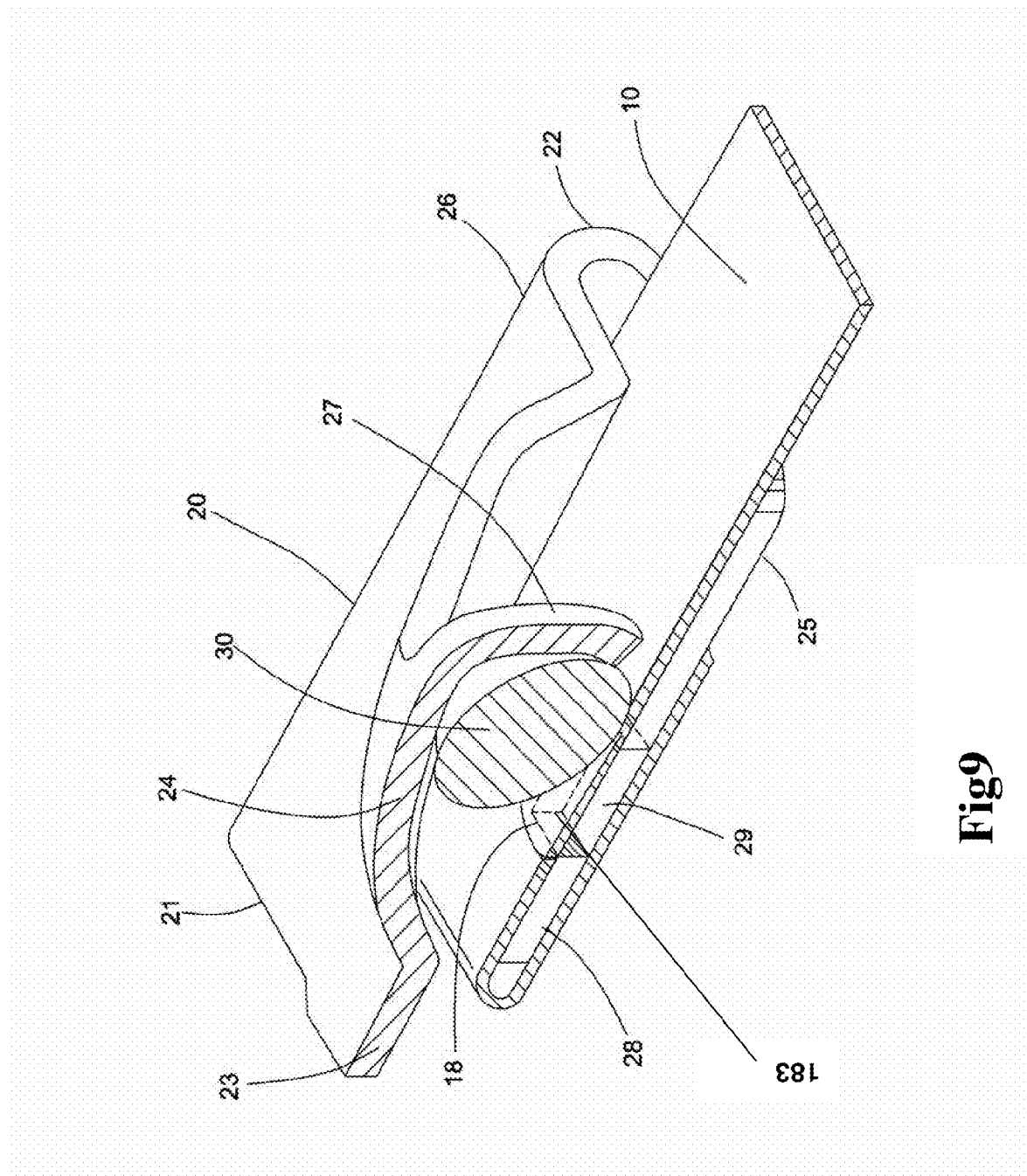
FIG. 9 is a sectional view illustrating the structure of metallic locking head and metallic roller means of the present invention.

Please refer to FIG. 9, which is a sectional view of the retention means 27 and metallic roller means 30 on the metallic locking head 20 of the present invention. A retention means 27 is concavely disposed near the strap exit end 22 of the metallic locking head 20 and extends from the ceiling 23 of the metallic locking head in the direction of the strap exit face 22 to form a quasi-bent finger-shaped structure. The finger-shaped structure of retention means 27 can be used to contact and lock a metallic roller means 30. The metallic roller means 30 in the present invention can be a ball structure or a cylindrical rollable metallic object.

Figure 10:
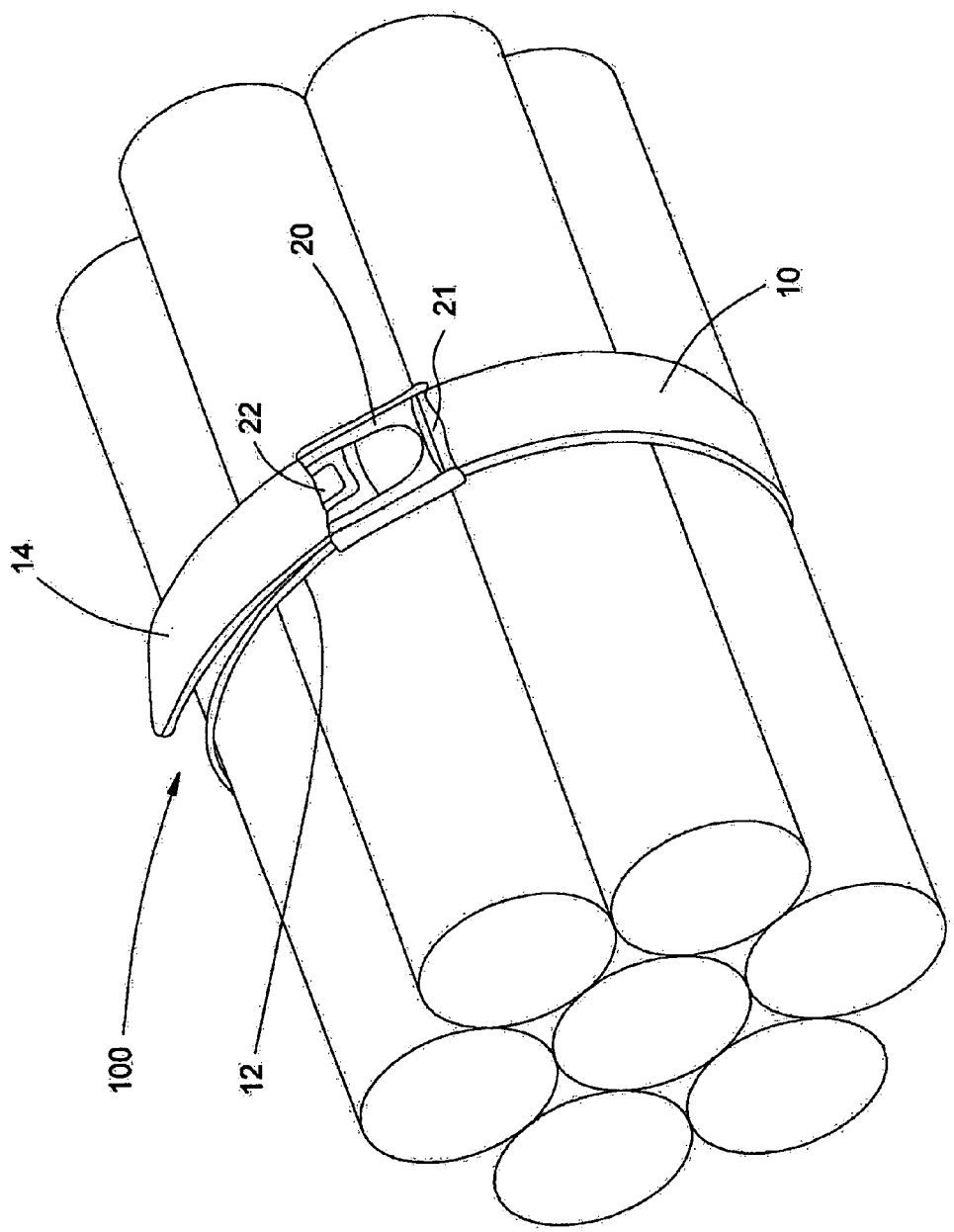
FIG. 10 is a diagram of a preferred embodiment of the present invention.

Then, please refer to FIG. 10, which is a diagram of the metal cable tie of the present invention bundling a large number of elongate objects. As shown in FIG. 10, metal cable tie 100 is formed by assembling metallic strap 10 and metallic locking head 20; the metallic strap 10 has a bent first end 12 and a second end 14 opposite the first end, and the metallic locking head 20 is secured to the first end 12 of the metallic strap and has a strap entry face 21 and a strap exit face 22 for receiving the second end 14 of the metallic strap to form a closed ring-shaped structure, and the metallic roller means 30 in metallic locking head 20 and the fixed position 18 formed by a dent in geometric shape on the metallic strap 10 are used to lock the second end 14 of the metallic strap. The detailed locking process will be described as follows.

When the second end 14 of the metallic strap 10 pierces through the strap entry face 21 of the metallic locking head 20 and then goes out from the strap exit face 22 of the metallic locking head, a closed metal cable tie 100 is thus formed and bundles the objects that are to be fastened, as shown in FIG. 10. At this moment, when the operator again pulls the second end 14 of the metallic strap in order to tighten it, normally a force pulling upward will be produced and it will drive the metallic roller means 30 to move toward the direction of the fixed position 18, which is a slope structure formed by a dent in geometric shape. Therefore when said metallic roller means 30 is pulled to roll, it will readily roll into the fixed position 18 along the slope structure. Obviously, in the present invention, the fixed position 18 formed by a dent in geometric shape is closer to the strap exit face 22 of the metallic locking head, in other words, it is disposed near the boundary area of the first end 12 of the metallic strap. When the metallic strap 10 lockingly engages the objects, the pulling force formed by the weight of objects and gravity will exert on the fixed position 18 through the metallic roller means 30 and force the fixed position 18 to distort. And since the rectangular aperture 29 of the floor 25 of the metallic locking head 20 is located beneath the fixed position, the distorted part of the fixed position 18 can connect with the rectangular aperture 29 and form an engaging structure which allows the metal cable tie to achieve the purpose of secure engagement. In addition, in another embodiment of the present invention, when at least a dent in geometric shape penetrates the metallic strap, the engaging structure formed by connection of the distorted part and the aperture can also be achieved. What should be emphasized is that the dent in geometric shape described in the present invention is selected from the group consisting of a cross, an X, two intersecting crosses, three intersecting crosses, or a ring-like shape. The purpose of such design is that not only the ball of metallic roller means 30 can roll into the fixed position 18 more readily, but the roller means 30 itself is also fully inset in the fixed position through the slit 28 and is more immovable. Thus the goal to securely engage said metal cable tie can be achieved.

Figure 11:
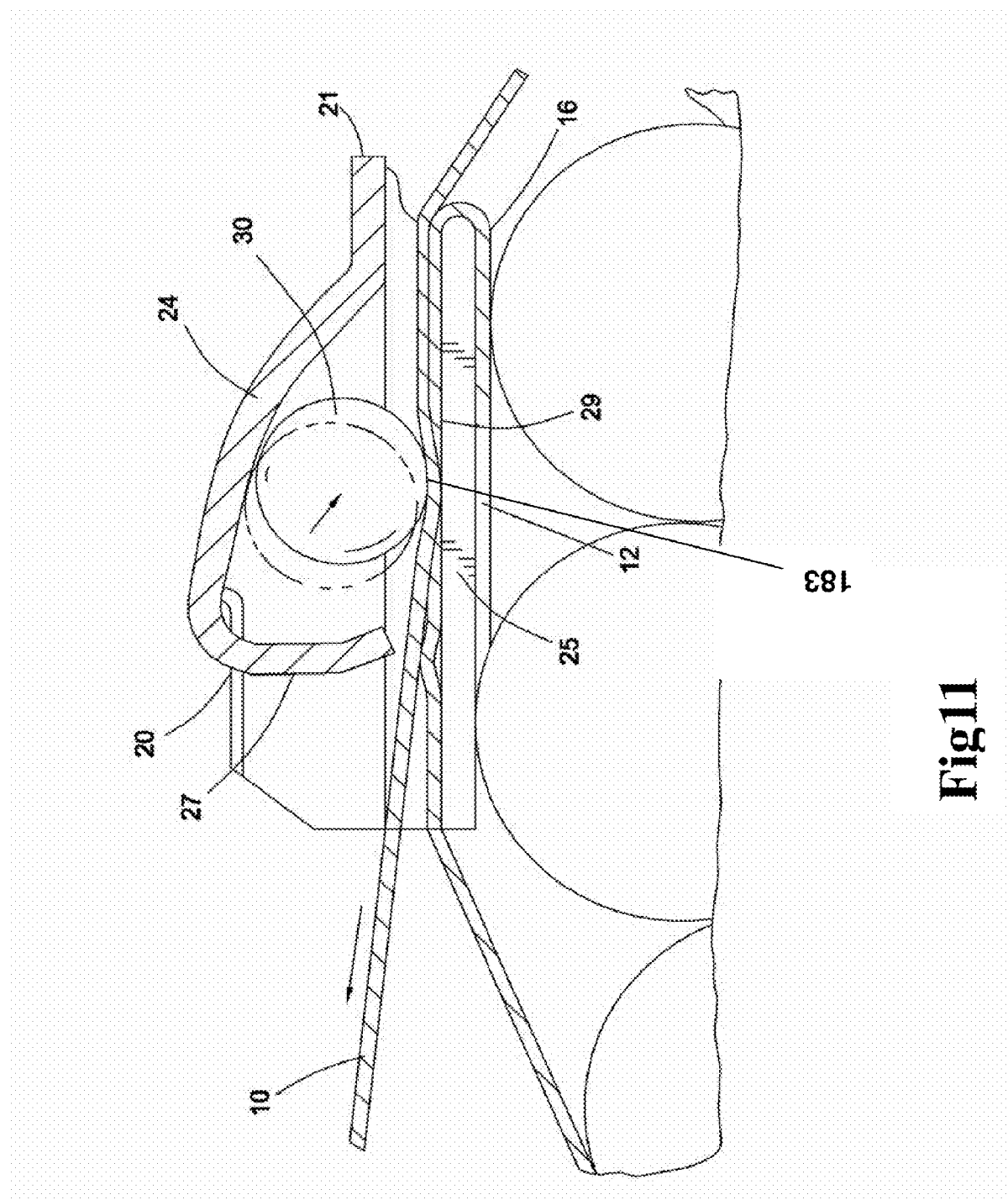
FIG. 11 is a diagram illustrating the operating process of the metallic roller means in the metallic locking head of the present invention.

As shown in FIG. 11, when the metallic strap 10 of metal cable tie 100 is pulled as described above, the metallic roller means 30 in metallic locking head 20 departs from the finger-shaped retention means 29 due to the force and is able to move between the area near the retention means 29 of the metallic locking head and the fixed position 18 near the strap entry face. In addition, the metallic strap 10, metallic locking head 20 and metallic roller means 30 are all formed of stainless steel and the surface of the metallic strap, metallic locking head, and metallic roller means are all coated with certain material so that the metal cable tie 100 can be used over a wide range of temperature and have higher resistance to corrosion.

What are described above are only preferred embodiments of the present invention and should not be used to limit the claims of the present invention; moreover, the above description can be understood and put into practice by those who are skilled in the present technical field, therefore equivalent changes or modifications made without departing from the spirit disclosed by the present invention should still be included in the appended claims.

What is claimed is:

1. A metal cable tie having a dent in geometric shape, comprising a metallic strap and a metallic locking head, said metallic strap having a first end and a second end opposite said first end, said metallic locking head being secured to said first end of said metallic strap and defined by a ceiling, a roof, a bottom wall connected to said roof and a pair of sidewalls to form a strap entry face and a strap exit face for receiving said second end of said metallic strap to form a closed ring-like structure, wherein said bottom wall having a longitudinal slit and an aperture in geometric shape connected to said longitudinal slit and disposed near said strap entry face; a retention means being further concavely disposed near said strap exit face of said metallic locking head and extending from said ceiling toward said strap exit face for captively holding a metallic roller means, said metallic roller means captively held by said metallic locking head being able to move between the area near said retention means near said strap exit face and a fixed position near said strap entry face when said metallic strap is lockingly engaged; the improvement comprising: said fixed position being near said first end of said metallic strap and formed by a dent in geometric shape as the locking position of said metallic roller means, wherein the depth of said dent in geometric shape is shallower than the depth of said metallic strap, and at least a part of said dent in geometric shape penetrates said metallic strap and forms a slot.

2. The metal cable tie having a dent in geometric shape according to claim 1, wherein the width of said dent in geometric shape is narrower than the width of said metallic strap.

3. The metal cable tie having a dent in geometric shape according to claim 1, wherein said dent in geometric shape is formed by stamping.

4. The metal cable tie having a dent in geometric shape according to claim 1, wherein said metallic strap is made of stainless steel.

5. The metal cable tie having a dent in geometric shape according to claim 1, wherein said metallic locking head is made of stainless steel.

6. The metal cable tie having a dent in geometric shape according to claim 1, wherein said metallic strap is coated with coating material.

7. The metal cable tie having a dent in geometric shape according to claim 1, wherein said coating material is selected from the group consisting of cold-resistant, heat-resistant, abrasion-resistant, insulation, acid-resistant, alkali-resistant, salt-resistant, or anti-corrosive materials, or the combination of any of the above.

8. The metal cable tie having a dent in geometric shape according to claim 1, wherein said coating material is selected from the group consisting of PVC, EPOXY, EVA, EPE, or the combination of any of the above.

9. The metal cable tie having a dent in geometric shape according to claim 1, wherein said roller means is a ball-like object.

10. The metal cable tie having a dent in geometric shape according to claim 1, wherein within said dent in geometric shape, at least one length of said dent is longer than the diameter of said ball-like object.

11. The metal cable tie having a dent in geometric shape according to claim 1, wherein said roller means is a rollable cylindrical object.

12. The metal cable tie having a dent in geometric shape according to claim 1, wherein said retention means is a finger-shaped structure.

13. The metal cable tie having a dent in geometric shape according to claim 1, wherein said aperture in geometric shape on said sidewalls of said metallic locking head is a rectangular structure.

* * * * *